Patented Aug. 31, 1937

2,091,466

UNITED STATES PATENT OFFICE 2,091,466

MOTTLED PAINT

Peter Busch, Newark, N. J., assignor to Rudolf Wildermann, New York, N. Y.

No Drawing. Application April 7, 1930,
Serial No. 442,271

8 Claims. (Cl. 134—39)

My invention relates to paints which give a mottled, multi-colored surface to objects they are applied to.

When an object is to be provided with a coating, which shows, distinctly, a variety of colors, it is a practice at the present state of the art to apply the various colors separately, from various sources of supply, and ordinarily also consecutively.

One object of my invention is to prepare a paint, producing a coat of paint, which shows, separately and distinctly, various colors, as it may be desired.

Another object of my invention is to produce a paint which, according to the manner in which it is applied produces various variegations of different colors in one single coat of paint.

A further object of my invention is to produce a multi-colored, mottled paint which may be preserved indefinitely.

A further object of my invention is to produce a paint by means of which a lasting mottled coat of paint may be produced on any object.

Another object of my invention is to produce a base liquor in which larger or smaller globules or drops of a multiplicity of enamels may be suspended in close proximity to each other without mixing with each other.

Another object of my invention is to produce a paint in which a multiplicity of globules and drops of enamels of various colors are stored in close proximity, separated by a base liquor which prevents the various globules of drops from diffusing or flowing into each other.

These and other objects I attain by preparing a base liquor into which are placed paints of various colors and in which they are substantially separately preserved.

This base liquor may exemplarily be prepared in the following manner:—

100 grams of powdered casein (commercial) are mixed with 0.4 liter of water, and 12 grams of a concentrated ammonia solution are added while the mixture is being stirred; the casein is thus brought into solution.

To the resulting paste I add 0.4 liter of water to reduce the mixture to a liquid consistency.

To this liquid I add 12 grams of denatured alcohol (96 proof), 2 grams of acetone and 50 grams of linseed oil, the solution being stirred while these ingredients are introduced. This mixture is allowed to stand for about six hours; it is stirred at intervals during this period of time and the casein should be completely dissolved at the end of that period. By the addition of 4 grams of formaldehyde (40% solution) the liquid is then reduced to a thick paste which is diluted by 0.2 liter of water.

This mixture is frequently stirred up during a period of from 6 to 8 hours and it is thereby reduced to a substantially uniform liquor.

The product is a milk-colored liquid, the base liquor, into which liquid enamels or varnish enamels of various colors can be introduced without flowing or diffusing into or mixing with each other.

The alcohol and acetone, serve, primarily, to balance the specific gravity of the liquor, and may be adjusted or substituted for accordingly. Or water, ordinary tap water, of moderate hardness may be used.

As stated above, this procedure of preparing my base liquor, is exemplary. It consists of casein or a similar product, which by a caustic solution, is brought into solution, and to which are added ingredients serving to increase the protection or "filming" quality of this liquid for globules or drops of liquid enamels, and for giving to the base liquor a specific gravity substantially equal to that of said liquid enamels.

The linseed oil may be omitted from this base liquor, or may be added to it later. If a larger amount of linseed oil, for instance 200 grams, is used with my base liquor, it may readily be used as a base liquor, to which colors are added in a dry state, a casein paint being the result.

The function of the formaldehyde is that of a preserving disinfectant. If the formaldehyde is omitted the base liquor has the same novel use of unmixedly suspending a variety of enamels. Such a paint can however not be preserved, under ordinary circumstance, for an unlimited period of time in the liquid state.

To produce a mottled liquid enamel with the above described base liquor, I proceed as follows:

To 2 parts of the base liquor I add, separately or successively, a total of four parts of the various enamels to be used for a mottled paint. One exemplary mixture of colors is obtained by using the following varnish enamels in my base liquor:

One part of chrome green enamel.
One part of medium chrome yellow enamel.
One part of toluidine red enamel.
One part of white enamel.

Such a four color enamel may be used as a paint; it is preferably stirred up before use, if it has been allowed to stand for a long period of time. It is not advisable to use a brush for the application of this paint, because the bristles or hairs of the brush will press the various colors into each other so that they flow into each other and actually mix. A very advantageous method of using my improved enamel is to dip the article to be colored, or to pour the enamel over the article, or to apply it with roller or pad. The enamel readily lends itself to an application by spraying.

All kinds of so called varnish enamels can be combined to form a mottled paint by my process. A quick drying enamel may be obtained by the addition of volatile liquids as commonly known in the art of manufacturing enamels.

Inasmuch as the globules or drops of the color enamels are located in close proximity to each other and as the pressure of one drop upon the other will flatten the sides of the drops or globules which normally have substantially the shape of ovoids, the consistency, and cohesive qualities of the enamels used, largely determine the proportion of the quantity of base liquor used in connection with a certain amount of color enamels. If the color enamels are thick, more base liquor may be used, because the drops or globules of enamels will have a greater tendency to keep their ovoid shape and therefore the voids between the globules or drops will be larger.

Having thus described my invention I do not desire to limit the scope thereof to the examples given and described; but I desire basic patent protection, my invention opening a new field in the art of paints and enamels.

I claim:

1. A mottled paint comprising an unpigmented base liquor containing an ammonia solution of casein, alcohol, and acetone, and liquid color enamels in the form of visually identifiable globules segregatedly contained in said base liquor, said enamels being immiscible with said liquor at atmospheric pressure.

2. A mottled paint comprising an unpigmented base liquor containing an ammonia solution of casein, alcohol, acetone and oil, and visually identifiable liquid color globules suspended in said liquor.

3. As a base liquor adapted undiffusedly to support relatively mottled enamel globules, an unpigmented casein solution, and ingredients mixed thereinto rendering said solution undiffusive in respect to enamel.

4. As a base liquor adapted undiffusedly to support differently colored enamel globules, an unpigmented solution of casein in aqueous ammonia, and alcohol, said solution being undiffusive in respect to globules of enamel.

5. As a base liquor adapted undiffusedly to suspend differently colored enamel globules, an unpigmented mixture, comprising a solution of casein in aqueous ammonia, and acetone, said solution being undiffusive in respect to globules of said enamel.

6. As a base liquor adapted to support mottled paint globules, without mixing therewith, an unpigmented mixture comprising a solution of casein in aqueous ammonia, alcohol and acetone in substantially the following proportion: 100 grams of casein, 12 grams of concentrated ammonia solution, 12 grams of alcohol and 2 grams of acetone, said solution being undiffusive in respect to globules of paint, so that a multiplicity of globules of paint may be segregatedly suspended in said solution.

7. As a base liquor adapted to support mottled paint globules without mixing therewith, an unpigmented mixture comprising a solution of casein in aqueous ammonia, alcohol, linseed oil and acetone in substantially the following proportion: 100 grams of casein, 12 grams of concentrated ammonia solution, 12 grams of alcohol, 30 grams of linseed oil and 2 grams of acetone, said solution being undiffusive in respect to globules of said paint, so that a multiplicity of globules of paint may be segregatedly suspended in said solution.

8. As a base liquor adapted to support mottled paint globules without mixing therewith an unpigmented mixture comprising a solution of casein in aqueous ammonia, alcohol, linseed oil and formaldehyde in substantially the following proportion: 100 grams of casein, 12 grams of concentrated ammonia solution, 12 grams of alcohol, 50 grams of linseed oil, and 4 grams of a 40% solution of formaldehyde, said solution being undiffusive in respect to globules of paint, so that a multipliicty of globules of paint may be segregatedly suspended in said solution.

PETER BUSCH.